(12) United States Patent
Thosteson et al.

(10) Patent No.: US 10,517,231 B2
(45) Date of Patent: Dec. 31, 2019

(54) VEGETATION GROW LIGHT EMBODYING POWER DELIVERY AND DATA COMMUNICATION FEATURES

(71) Applicant: Biological Innovation & Optimization Systems, LLC, Melbourne, FL (US)

(72) Inventors: Eric Thosteson, Satellite Beach, FL (US); Neil Yorio, Indian Harbour Beach, FL (US)

(73) Assignee: Biological Innovation and Optimization Systems, LLC, Carlsbad, CA (US)

( * ) Notice: Subject to any disclaimer, the term of this patent is extended or adjusted under 35 U.S.C. 154(b) by 78 days.

(21) Appl. No.: 15/948,144

(22) Filed: Apr. 9, 2018

(65) Prior Publication Data

US 2018/0332777 A1    Nov. 22, 2018

Related U.S. Application Data

(63) Continuation of application No. 15/148,194, filed on May 6, 2016, now Pat. No. 9,943,042.

(60) Provisional application No. 62/323,004, filed on Apr. 15, 2016, provisional application No. 62/175,724, filed on Jun. 15, 2015, provisional application No. 62/162,882, filed on May 18, 2016.

(51) Int. Cl.
| | |
|---|---|
| *F21S 4/00* | (2016.01) |
| *A01G 9/24* | (2006.01) |
| *H05B 37/02* | (2006.01) |
| *F21V 23/00* | (2015.01) |
| *F21S 8/06* | (2006.01) |
| *A01G 9/26* | (2006.01) |
| *F21Y 115/10* | (2016.01) |

(52) U.S. Cl.
CPC .............. *A01G 9/247* (2013.01); *A01G 9/26* (2013.01); *F21S 8/061* (2013.01); *F21V 23/003* (2013.01); *H05B 37/0263* (2013.01); *H05B 37/0272* (2013.01); *F21Y 2115/10* (2016.08); *Y02A 40/27* (2018.01); *Y02A 40/274* (2018.01)

(58) Field of Classification Search
CPC ........ A01G 9/247; F21V 23/003; F21S 8/061; F21Y 2115/10; Y02A 40/27; Y02A 40/274
USPC ......................................................... 362/221
See application file for complete search history.

(56) References Cited

U.S. PATENT DOCUMENTS

| | | |
|---|---|---|
| 3,869,605 A | 3/1975 | Davis |
| 3,931,695 A | 1/1976 | Widmayer |
| 4,768,390 A | 9/1988 | Baker et al. |
| 5,012,609 A | 5/1991 | Ignatius et al. |
| 5,253,302 A | 10/1993 | Massen |
| 5,299,383 A | 4/1994 | Takakura et al. |

(Continued)

OTHER PUBLICATIONS

Office Action dated Sep. 21, 2018 for U.S. Appl. No. 15/181,622.

*Primary Examiner* — Ali Alavi
(74) *Attorney, Agent, or Firm* — MLO, a professional corp.

(57) ABSTRACT

Embodiments of the invention relate to fixtures, systems and methods for providing vegetation grow light fixtures with auxiliary power and/or data communication ports or hubs allowing for expansion of their functionality, modularity and adaptability. The addition of power or communication ports integrated with a grow light fixture enables other components to be connected directly to and powered by the grow light fixture. Such components may include but are not limited to supplemental lighting, sensors and actuators.

20 Claims, 6 Drawing Sheets

(56) References Cited

U.S. PATENT DOCUMENTS

| | | | |
|---|---|---|---|
| 5,606,821 A | 3/1997 | Sadjadi et al. |
| 5,813,753 A | 9/1998 | Vriens et al. |
| 5,851,063 A | 12/1998 | Doughty et al. |
| 5,959,316 A | 9/1999 | Lowery |
| 6,294,800 B1 | 9/2001 | Duggal et al. |
| 6,357,889 B1 | 3/2002 | Duggal et al. |
| 6,441,558 B1 | 8/2002 | Muthu et al. |
| 6,459,919 B1 | 10/2002 | Lys et al. |
| 6,538,371 B1 | 3/2003 | Duggal et al. |
| 6,552,495 B1 | 4/2003 | Chang |
| 6,554,439 B1 | 4/2003 | Teicher et al. |
| 6,554,450 B2 | 4/2003 | Fang et al. |
| 6,577,080 B2 | 6/2003 | Lys et al. |
| 6,586,882 B1 | 7/2003 | Harbers |
| 6,636,003 B2 | 10/2003 | Rahm et al. |
| 6,641,283 B1 | 11/2003 | Bohler |
| 6,680,200 B2 | 1/2004 | Everett |
| 6,685,852 B2 | 2/2004 | Setlur et al. |
| 6,734,465 B1 | 5/2004 | Taskar et al. |
| 6,880,291 B2 | 4/2005 | Raun et al. |
| 6,914,265 B2 | 7/2005 | Bawendi et al. |
| 6,921,182 B2 | 7/2005 | Anderson et al. |
| 6,936,857 B2 | 8/2005 | Doxsee et al. |
| 6,967,116 B2 | 11/2005 | Negley |
| 7,005,679 B2 | 2/2006 | Tarsa et al. |
| 7,008,559 B2 | 3/2006 | Chen |
| 7,015,636 B2 | 3/2006 | Bolta |
| 7,034,934 B2 | 4/2006 | Manning |
| 7,058,197 B1 | 6/2006 | McGuire et al. |
| 7,125,143 B2 | 10/2006 | Hacker |
| 7,135,664 B2 | 11/2006 | Vomsand et al. |
| 7,215,074 B2 | 5/2007 | Shimizu et al. |
| 7,222,220 B2 | 5/2007 | Cypher et al. |
| 7,234,844 B2 | 6/2007 | Bolta et al. |
| 7,250,715 B2 | 7/2007 | Mueller et al. |
| 7,255,457 B2 | 8/2007 | Ducharme et al. |
| 7,256,557 B2 | 8/2007 | Lim et al. |
| 7,264,527 B2 | 9/2007 | Bawendi et al. |
| 7,319,293 B2 | 1/2008 | Maxik |
| 7,324,076 B2 | 1/2008 | Lee et al. |
| 7,365,485 B2 | 4/2008 | Fukasawa et al. |
| 7,382,091 B2 | 6/2008 | Chen et al. |
| 7,387,405 B2 | 6/2008 | Ducharme et al. |
| 7,520,607 B2 | 4/2009 | Casper et al. |
| 7,573,210 B2 | 8/2009 | Ashdown et al. |
| 7,598,686 B2 | 10/2009 | Lys et al. |
| 7,598,961 B2 | 10/2009 | Higgins |
| 7,678,140 B2 | 3/2010 | Brainard et al. |
| 7,679,281 B2 | 3/2010 | Kim et al. |
| 7,684,007 B2 | 3/2010 | Hull et al. |
| 7,690,802 B2 | 4/2010 | Higley et al. |
| 7,703,943 B2 | 4/2010 | Li et al. |
| 7,728,846 B2 | 6/2010 | Higgins et al. |
| 7,748,845 B2 | 7/2010 | Casper et al. |
| 7,766,518 B2 | 8/2010 | Piepgras et al. |
| 7,828,453 B2 | 11/2010 | Tran et al. |
| 7,845,823 B2 | 12/2010 | Mueller et al. |
| 7,972,030 B2 | 7/2011 | Li |
| 7,984,989 B2 | 7/2011 | Gruber |
| 8,038,314 B2 | 10/2011 | Ladewig |
| 8,115,419 B2 | 2/2012 | Given et al. |
| 8,192,047 B2 | 6/2012 | Bailey et al. |
| 8,207,676 B2 | 6/2012 | Hilgers |
| 8,253,336 B2 | 8/2012 | Maxik et al. |
| 8,256,921 B2 | 9/2012 | Crookham et al. |
| 8,297,783 B2 | 10/2012 | Kim |
| 8,324,808 B2 | 12/2012 | Maxik et al. |
| 8,324,823 B2 | 12/2012 | Choi et al. |
| 8,362,684 B2 | 1/2013 | Bawendi et al. |
| 8,378,574 B2 | 2/2013 | Schlangen et al. |
| 8,401,231 B2 | 3/2013 | Maxik et al. |
| 8,410,725 B2 | 4/2013 | Jacobs et al. |
| 8,441,210 B2 | 5/2013 | Shteynberg et al. |
| 8,446,095 B2 | 5/2013 | Maxik et al. |
| 8,513,875 B2 | 8/2013 | Ven et al. |
| 8,547,391 B2 | 10/2013 | Maxik et al. |
| 8,643,276 B2 | 2/2014 | Maxik et al. |
| 8,680,457 B2 | 3/2014 | Maxik et al. |
| 8,686,641 B2 | 4/2014 | Maxik et al. |
| 8,743,023 B2 | 6/2014 | Maxik et al. |
| 8,754,832 B2 | 6/2014 | Maxik et al. |
| 8,901,850 B2 | 12/2014 | Maxik et al. |
| 8,941,329 B2 | 1/2015 | Maxik et al. |
| 9,024,536 B2 | 5/2015 | Maxik et al. |
| 9,030,103 B2 | 5/2015 | Pickard |
| 9,036,244 B2 | 5/2015 | Maxik et al. |
| 9,039,746 B2 | 5/2015 | Ven et al. |
| 9,052,067 B2 | 6/2015 | Ven et al. |
| 9,127,818 B2 | 9/2015 | Maxik et al. |
| 9,131,573 B2 | 9/2015 | Maxik et al. |
| 9,137,874 B2 | 9/2015 | Maxik et al. |
| 9,173,269 B2 | 10/2015 | Maxik et al. |
| 9,174,067 B2 | 11/2015 | Maxik et al. |
| 9,220,202 B2 | 12/2015 | Maxik et al. |
| 9,265,968 B2 | 2/2016 | Maxik et al. |
| 9,289,574 B2 | 3/2016 | Maxik et al. |
| 9,322,516 B2 | 4/2016 | Boomgaarden et al. |
| 9,326,454 B2 | 5/2016 | Suzuki |
| 9,353,916 B2 | 5/2016 | Maxik et al. |
| 9,441,793 B2 | 9/2016 | Ven et al. |
| 9,986,697 B1 * | 6/2018 | Gurin ............... A01G 31/06 |
| 2001/0002049 A1 | 5/2001 | Reeh et al. |
| 2001/0047618 A1 | 12/2001 | Fang et al. |
| 2002/0026659 A1 | 2/2002 | Blowers et al. |
| 2003/0005626 A1 | 1/2003 | Yoneda et al. |
| 2003/0009933 A1 | 1/2003 | Yoneda et al. |
| 2004/0052076 A1 | 3/2004 | Mueller et al. |
| 2004/0105261 A1 | 6/2004 | Ducharme et al. |
| 2004/0109302 A1 | 6/2004 | Yoneda et al. |
| 2004/0217364 A1 | 11/2004 | Tarsa et al. |
| 2004/0218387 A1 | 11/2004 | Gerlach |
| 2004/0259363 A1 | 12/2004 | Bawendi et al. |
| 2004/0264193 A1 | 12/2004 | Okumura |
| 2005/0030744 A1 | 2/2005 | Ducharme et al. |
| 2005/0267213 A1 | 12/2005 | Gold et al. |
| 2005/0281027 A1 | 12/2005 | Capen et al. |
| 2006/0002110 A1 | 1/2006 | Dowling et al. |
| 2006/0053691 A1 | 3/2006 | Harwood et al. |
| 2006/0104058 A1 | 5/2006 | Chemel et al. |
| 2006/0105482 A1 | 5/2006 | Alferink et al. |
| 2006/0138435 A1 | 6/2006 | Tarsa et al. |
| 2006/0152140 A1 | 7/2006 | Brandes |
| 2006/0152172 A9 | 7/2006 | Mueller et al. |
| 2006/0164005 A1 | 7/2006 | Sun |
| 2006/0181192 A1 | 8/2006 | Radkov et al. |
| 2007/0058368 A1 | 3/2007 | Partee et al. |
| 2007/0170447 A1 | 7/2007 | Negley et al. |
| 2007/0276606 A1 | 11/2007 | Radkov et al. |
| 2007/0289207 A1 | 12/2007 | May et al. |
| 2008/0119912 A1 | 5/2008 | Hayes |
| 2008/0302004 A1 | 12/2008 | Lin |
| 2009/0199470 A1 | 8/2009 | Capen et al. |
| 2009/0288340 A1 | 11/2009 | Hess |
| 2010/0020536 A1 | 1/2010 | Bafetti et al. |
| 2010/0076620 A1 | 3/2010 | Loebl et al. |
| 2010/0115837 A1 * | 5/2010 | Van Der Poel ........ A01G 7/045<br>47/66.6 |
| 2010/0121420 A1 | 5/2010 | Fiset et al. |
| 2010/0244735 A1 | 9/2010 | Buelow, II |
| 2010/0244740 A1 | 9/2010 | Alpert et al. |
| 2010/0287830 A1 | 11/2010 | Chen et al. |
| 2011/0115385 A1 | 5/2011 | Waumans et al. |
| 2011/0162101 A1 | 6/2011 | Cahoon et al. |
| 2011/0205738 A1 | 8/2011 | Peifer et al. |
| 2011/0209400 A1 | 9/2011 | Rooymans |
| 2011/0242453 A1 | 10/2011 | Ven et al. |
| 2012/0003728 A1 | 1/2012 | Lanoue et al. |
| 2012/0111954 A1 * | 5/2012 | Kim .................. A01G 9/24<br>236/49.1 |
| 2012/0218750 A1 | 8/2012 | Klase et al. |
| 2013/0021792 A1 | 1/2013 | Snell et al. |
| 2013/0255150 A1 * | 10/2013 | Karpinski ............ A01G 7/045<br>47/58.1 LS |
| 2013/0278148 A1 | 10/2013 | Maxik et al. |

(56) References Cited

U.S. PATENT DOCUMENTS

| | | |
|---|---|---|
| 2013/0278172 A1 | 10/2013 | Maxik et al. |
| 2013/0293148 A1* | 11/2013 | Holland ................ F21V 5/04 315/297 |
| 2014/0015438 A1* | 1/2014 | Maxik ............... H05B 33/0842 315/292 |
| 2014/0049191 A1 | 2/2014 | Maxik et al. |
| 2014/0049192 A1* | 2/2014 | Maxik ............... H05B 33/0863 315/307 |
| 2014/0185281 A1* | 7/2014 | Lee ................... H01L 25/0753 362/231 |
| 2014/0215911 A1* | 8/2014 | Suzuki ................... A01H 3/02 47/58.1 LS |
| 2014/0259905 A1 | 9/2014 | Ovadya et al. |
| 2014/0330406 A1 | 11/2014 | Faris |
| 2015/0128489 A1 | 5/2015 | Yamada et al. |
| 2015/0223402 A1 | 8/2015 | Krijn et al. |
| 2016/0037730 A1 | 2/2016 | Whittingham |
| 2016/0109107 A1 | 4/2016 | Grajcar |
| 2017/0188531 A1 | 7/2017 | Daniels |

* cited by examiner

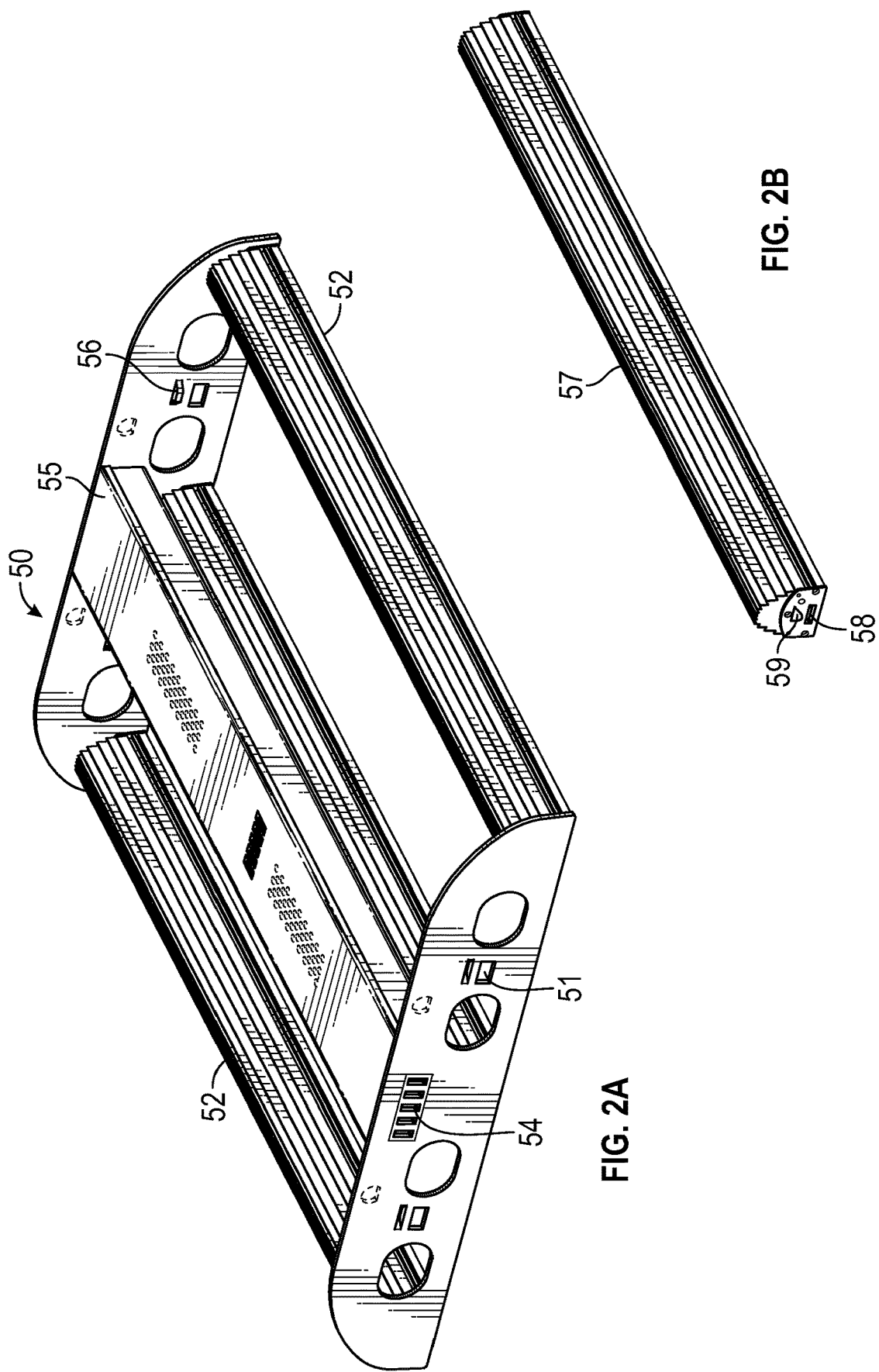

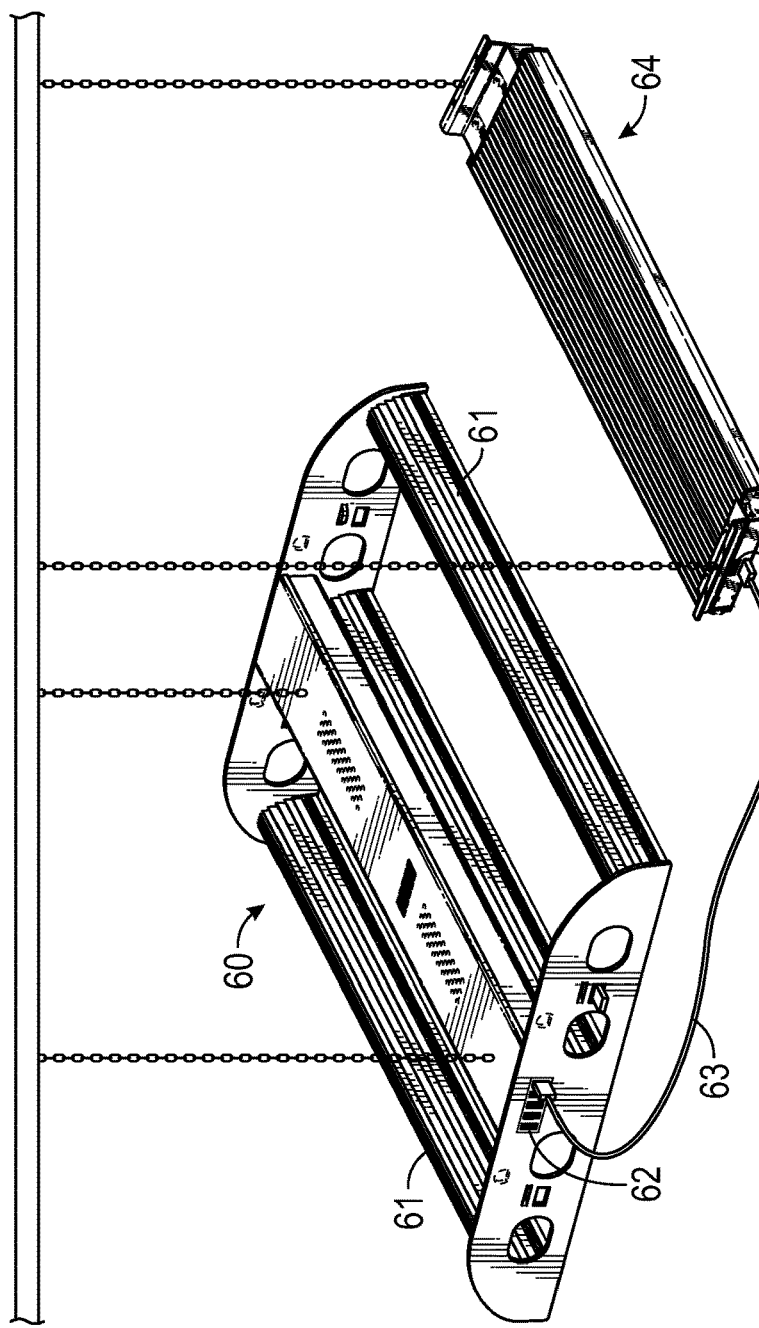
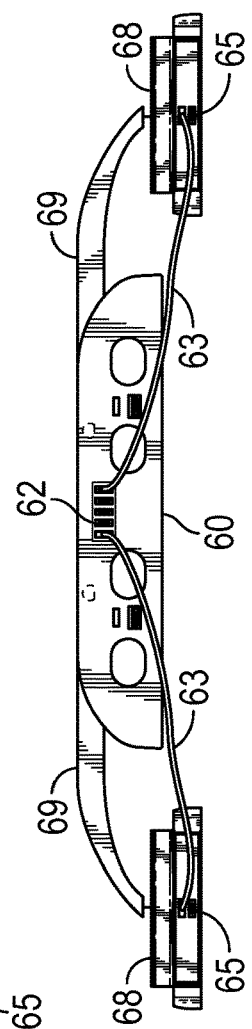
FIG. 3A
FIG. 3B

VEGETATION GROW LIGHT EMBODYING POWER DELIVERY AND DATA COMMUNICATION FEATURES

RELATED APPLICATIONS

This application is a continuation application of application Ser. No. 15/148,194, filed May 6, 2016 which claims priority to and the benefit of U.S. Provisional Application No. 62/162,882, filed May 18, 2015, U.S. Provisional Application No. 62/175,724, filed Jun. 15, 2015, and U.S. Provisional Application No. 62/323,004, filed Apr. 15, 2016. The contents of each of those applications are incorporated herein in their entirety.

FIELD OF THE INVENTION

Embodiments of the invention relate generally to LED lighting fixtures that incorporate supplemental external power ports and electrical communication capabilities for providing power to ancillary devices and for receiving and transmitting data or control signals.

BACKGROUND OF THE INVENTION

Indoor agricultural and horticultural operations where plants are grown under artificial lighting are increasingly commonplace. Some advantages of indoor plant growth operations include allowing for extended growing cycles, increased yield per unit area (e.g., vertical framing), fine tuning of environmental variables including light output to enhance plant yield, security and enhance ability to monitor the operation. Various types of grow lights are available including incandescent, fluorescent, compact fluorescent, metal halide, high pressure sodium, and light emitting diodes (LEDS) based lighting. Each type presents unique characteristics, such as, cost to purchase, cost to operate, efficiency, light spectrum and radiant power output, etc. Key features of plant grow lights include providing the appropriate amount of photosynthetically active radiation (PAR) to ensure and optimize plant growth. Providing the appropriate radiant spectrum and power while minimizing energy consumption is another important goal of indoor growing operations and a benchmark metric of plant growth fixtures.

Light emitting diodes (LED) technology is rapidly being applied to the agricultural and horticultural fields to allow for high efficiency indoor plant cultivation and growth. The increased energy efficiency of LED technology compared with other lighting solutions coupled with the reduction of costs of LED themselves are increasing the number of LED applications and rates of adoptions across industries. Examples of such industries and markets include plant growing applications spanning the breadth from small indoor home greenhouses and nurseries to full scale indoor farming facilities. LEDs and associated technologies are becoming increasingly electrically efficient and are supplanting other lighting technologies because of this efficiency and associated cost savings. LED technology also promises greater reliability overall lifetimes than other lighting technologies. Importantly, LED technology and solid state lighting (SSL) in general provides a platform to customize specific light output spectra to meet the demands of any specific application thereby increasing efficiency and optimizing the light output to meet the desired application. This feature of tailoring and tuning output spectra of LED fixtures can be used in the grow lighting and other arenas to provide the specific wavelengths and wavelength ranges tailored and optimized to the specific application. For example, LED lights with specific wavelengths in the far red and ultraviolet bands are of interest to some growers for use during certain stages of plant growth to elicit a variety of positive plant growth and quality responses. Generally, optimization of photo-synthetically active regions of the light spectrum depending on the plant species and/or growth cycle can both reduce energy consumption and enhance plant growth and yield.

In many cases indoor plant grow operations may allow for a greater control over the ambient environment and radiant flux than an outdoor grow operation. For example, supplemental lighting may be added or removed at will. Supplemental lighting may be provided to optimize the photon flux on plant targets during specific times of the growth cycle. Adding supplemental lighting, e.g., additional grow light fixtures, generally requires running a new separate power cable and is cumbersome and time-consuming and can add expense.

A wide variety of environmental and plant related sensors can be utilized to measure environmental and plant parameters. Measured data and sensor output may be utilized to adjust the environment variables including for example humidity and temperature. However, sensors generally require power and require communication capabilities. Installing new power outlets and communication lines for each sensor is costly and inconvenient. The used of supplemental lighting and sensors for environmental sensing and control can allow for customized grow operations and provide for enhanced plant yields, but the implementation, customization, and need to modify and change the location of these components over time in a grow facility can be time consuming and challenging.

Adding supplemental lighting and/or environmental sensors requires both a source of power for the lighting and sensors and communication channels for obtaining and processing sensor data and for lighting and environmental control. Having the ability to move lighting and sensors freely to adjust the layout of the grow operation as needed can provide enhanced customization and tailorability of a grow operation. However, adding a supplemental lighting at a particular place in the grow facility, for a particular time period, or adding a new sensor and/or feedback control system at a particular point in a grow facility requires the challenges of sourcing power and communication ports for the new lighting or sensors, and generally requires running new power and/or communication lines and setting up new support infrastructure, each of which can be costly, labor and time intensive, and which does not lend itself to easy modification.

BRIEF SUMMARY OF EMBODIMENTS OF THE INVENTION

Embodiments of the invention relate to fixtures, systems and methods for providing vegetation grow light fixtures with auxiliary power and/or communication ports or hubs and for expansion of their functionality, modularity and adaptability. The addition of power or communication ports integrated with a grow light fixture enables other components to be connected directly to and powered by the grow light fixture. Such components may include but are not limited to supplemental lighting, environmental or plant sensors, actuators, control systems, computers, etc. Example embodiments include grow light fixtures that incorporate one or more USB (universal serial bus) ports. USB ports are now commonplace and a well known component in many electronic devices. The ports function as bidirectional data and power supply points, and can supply power up to and potentially exceeding 100 W. Other example embodiments include grow light fixtures with incorporated Power-over-Ethernet (PoE) hubs. PoE hubs can supply power up to and in excess of 200 W. USB ports or PoE hubs or both are incorporated into grow light fixtures in order to provide a power source for auxiliary devices (e.g., supplemental lighting and sensors) and a communications channel (e.g., for lighting and other devices, control, and sensor feedback). These power and communication ports, onboard each fixture, eliminate the need for separate power sources or the need to run separate wiring in the grow facility for powering and communications. Supplemental lighting and sensors may be connected directly to an existing grow light fixture. Incorporating these power delivery components within a grow light avoids the time consuming and cumbersome tasks of removing certain grow lights to provide room for other grow lights or extending power cords from a power supply outlet to a newly added grow light. A grow light fixture with provisions for supplying power to other grow light fixtures adds considerable overall delivered light and spectral flexibility to a plant growing operation at minimal cost.

Some embodiments of the invention include a lighting fixture with an integrated supplemental power source comprising an LED light engine, a power supply for powering the LED light engine, an auxiliary power source operative to provide output power from the lighting fixture, and an input means for receiving power from an external power source to provide power to said power supply and to said auxiliary power source. Embodiments of the invention include an LED grow light fixture with integrated supplemental power, wireless and sensor capabilities comprising an LED light engine operative to produce light tailored for plant growth, including a power a power supply for powering said LED light engine, a USB port or Ethernet Hub operative to provide output power from the lighting fixture and provide for data communications, a means for wireless communications, and a sensor for measuring at least one aspect of the environment or lighting fixture output and wherein the sensor is powered by said USB port or Ethernet hub.

Some embodiments include a supplemental lighting module for providing supplemental lighting wherein the supplemental lighting module is powered by an auxiliary power source from a main lighting fixture and not powered directly by said power supply.

Some embodiment include a lighting fixture comprising an antenna for wireless communication. In some embodiments the lighting fixture includes an integrated Bluetooth communications module. In some embodiments wireless communications are used for sensing and/or actuation.

In some embodiments, the lighting fixture includes an auxiliary power source that can also send and receive data signals. Embodiments include signaling, controlling and/or powering one or more switches or actuators. In some embodiments the switches or actuators control at least one of: lighting, ventilation or air temperature, humidity, soil irrigation, fixture orientation or configuration, video cameras, warnings, or data logging.

In some embodiments the main lighting fixture is designed to be powered and operate on digital power.

BRIEF DESCRIPTION OF THE DRAWINGS

FIGS. 2a-c show an LED lighting fixture with integrated external power ports, and a supplemental light bar powered by the external port according to some embodiments.

FIGS. 3a-b show an LED lighting fixture with integrated external power and communication ports, and supplemental light modules which are connected to and powered by the external ports according to some embodiments.

DETAILED DESCRIPTION OF EMBODIMENTS OF THE INVENTION

Figure 1:
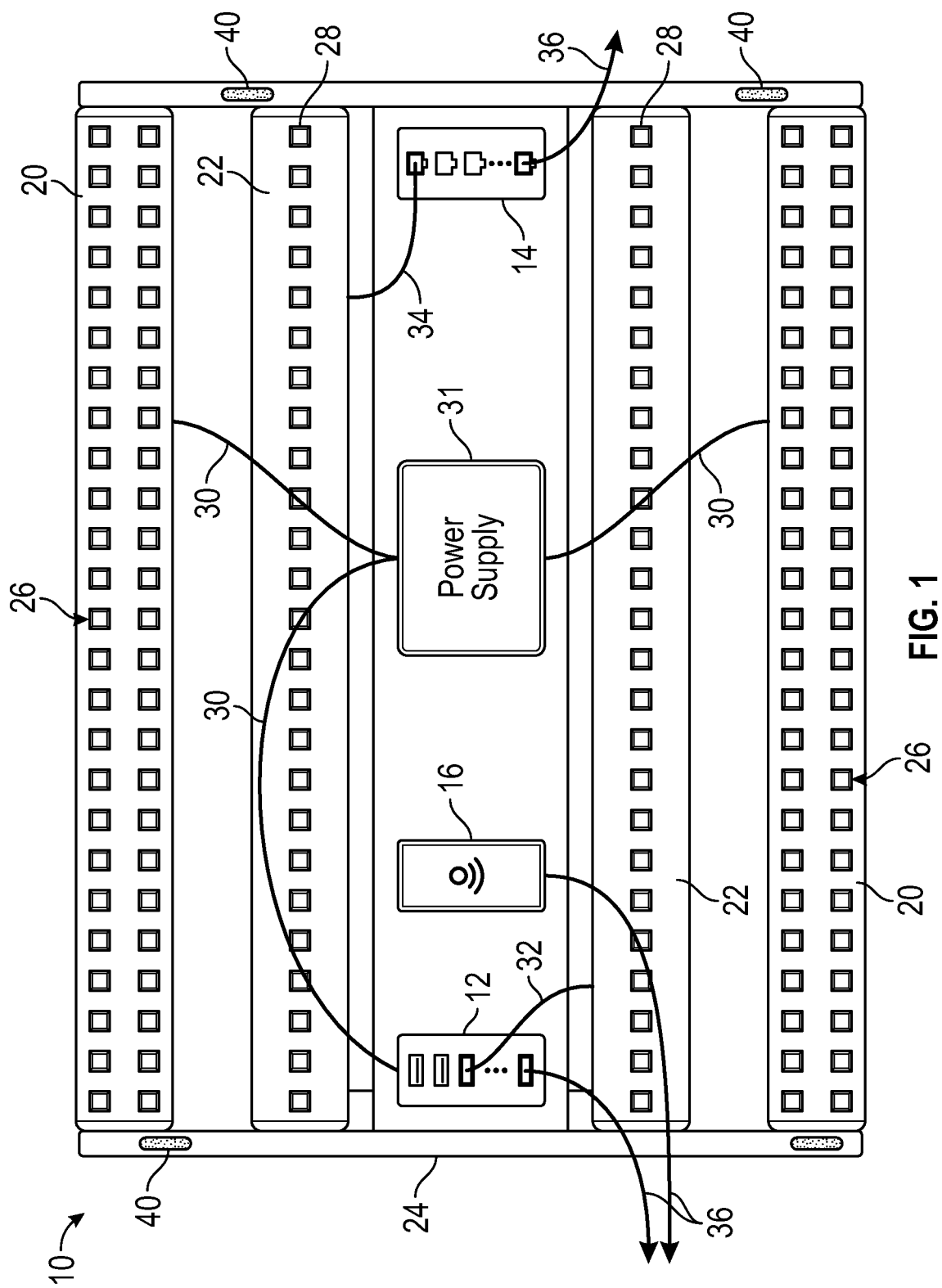
FIG. 1 is a schematic diagram showing an LED lighting fixture with integrated external power ports, a Bluetooth radio module, and multiple sensors according to some embodiments.

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

According to one embodiment of the invention a grow light fixture comprises one or both of a USB port and a power-over-Ethernet hub to enable either ancillary power, data communications or both. Power can be supplied through the USB port or the Ethernet hub to provide power to ancillary devices including but not limited to additional lighting including grow lights, sensors, cameras or other electronic devices. Data communications capability provided by the USB port or Ethernet hub allows for plug and play sensor connections, sensor readout and transmission, and control of peripheral units such as supplemental lighting, switches and actuators.

With power available at the light fixture the LED light fixture becomes a hub on which additional components can be connected and powered. For example supplemental grow lights may be added onto or in proximity to the LED fixture and powered by the LED fixture (via the integrated USB port or Ethernet hub). Supplemental grow lights can be easily added, removed and replaced during any stage of the plant growth cycle without the need of a separate or dedicated power source, This allows for auxiliary lights with different spectra to be easily added to the grow operation when needed by connecting to a existing light fixture that has an external power port. Supplementing the standard grow light spectrum with light from accessory LED bars, lamps, or other luminaries during the grow cycle provides many advantages including optimizing spectral irradiance on plants during the growth cycle and allowing spectral customization while using a standard LED grow fixture with a static spectrum. This ability to customize the spectral output by selectively adding supplemental lighting eliminates the need to add special wavelength LEDs to the standard grow light spectrum used on the basic grow light product.

Data communications available at the LED light fixture via a USB port or an Ethernet hub integrated into the fixture also provides the capability to attach or connect auxiliary sensors and actuators which is useful for continuous assessment and control of the grow environment. The health and development of the plants may be monitored throughout the growth cycle and manual or automated adjustments of various plant and environmental parameters may be made based on sensor feedback providing for tailoring of input parameters, and for greater efficiency and plant yield. For example, sensor feedback and actuator control enables the ability to measure and tune the radiation spectrum incident on the plants (e.g., through activation of supplemental grow lights), and also allows for the control and operation of automated systems, such as temperature, humidity control and water and nutrient delivery systems. The grow light fixture can thereby become a sensor hub for monitoring various aspects of the plant growth operation and a control hub for adjusting environmental and other variables in support of automation.

Some exemplary sensors that can be used according to the teachings of embodiments of the invention include but are not limited to: an infrared thermopile sensor to remotely measure the plant temperature, an air flow sensor, air temperature and humidity sensors, CO2 and other atmospheric gas sensors, light quantity and spectral measurement (spectrometer) sensors, pH and electrical conductivity sensors, proximity sensors, and a soil moisture sensor. Certain sensors can be connected directly to the USB port or Ethernet hub and the data carried over the communications backbone. Other sensors, such as a soil sensor disposed at the plant level may communicate with the hub wirelessly (e.g., to avoid the tangle of wires from the sensor to the hub). In some embodiments a wireless communication module is integrated in the LED lighting fixture. In one embodiment, a Bluetooth Low Energy communications protocol is used and a Bluetooth Low Energy host is incorporated into the LED fixture.

In some embodiments an Ethernet-based network may be used for video surveillance. In some embodiments, an Ethernet network provides a communications backbone for sensor data and control signaling. A monitoring and control station may use this communication backbone to send raw commands to actuators located at the growth site and connected through the light fixture, or to send configuration settings to a controller integrated in the fixture. Higher level network access from the lighting fixture may be available through a WiFi or a power line carrier communications system.

FIG. 1 shows a schematic diagram of an LED lighting fixture according to one embodiment. The LED fixture 10 comprises integrated light modules 20, each comprising one or more LEDs 26, for providing light output; a power supply 31 for powering and driving the light modules 20; a plurality of USB ports 12 and an Ethernet hub 14 for providing ancillary power and data communications capability; and a Bluetooth Low Energy radio module and antenna 16 for providing wireless communications. The fixture 10 also comprises means for receiving electrical power such as an AC power cord (not shown). The fixture 10 further comprises auxiliary LED grow lights 22, each comprising one or more LEDs 28, the auxiliary LED lights 22 being secured onto a frame 24. The integrated LED grow lights 20 are an integral part of the fixture, powered through conductors 30 from power supply 31. In one embodiment the USB port 12 supplies power to an auxiliary grow light 22 over conductors 32, and the Ethernet hub 14 supplies power (Power over Ethernet (PoE)) to an auxiliary grow light 22 over a conductor 34. It should be understood that the inclusion of both a USB port and Ethernet Hub is not a requirement of embodiments of the invention. Other embodiments include one or more USB ports or Ethernet hubs but not both. Also, embodiments of the invention do not require supplemental lighting modules. The inclusion of a Bluetooth wireless communications module is also an optional feature. Other forms or methods of personal area network (PAN) or non-meshed communications may be used. Additionally, other wireless (e.g., Wi-Fi, LAN, WLAN, IR) and wireline data communication schemes may be used to send and receive data may be included in the LED light fixture as will be evident to those skilled in the art.

According to one embodiment, one or more optional sensors 40 mounted on the frame 24 sense data regarding environmental conditions proximate to the plants (not shown) and communicate this data to the USB port 12 and/or the Ethernet hub 14 over data lines not depicted in FIG. 1. Additional sensors remote from the fixture 10 (such as a soil moisture, not shown) may provide sensor data, communicated wirelessly, that are received by the Bluetooth radio module 16. Although the sensors 40 are depicted as mounted on an end plate of the fixture 10, in other embodiments the sensors can be mounted in other advantageous locations. For example, the sensors can be integral with a fixture support bracket, or in other embodiments the sensors may be disposed at other locations on the fixture, proximal to the fixture, or even distal to the fixture. In some embodiments, the sensors are tethered to the fixture or otherwise remote from the fixture. The data network and power delivery capabilities integrated into the fixture simplify the connection of sensors for monitoring, for instance, water temperature, salinity, and water flow, and also may power other devices.

In one embodiment, the integrated grow lights 20, the integral USB port 12, the Ethernet hub 14, and/or the Bluetooth Low Energy radio 16 are powered by a DC power supply 31, for example and switched mode power supply. In some embodiments, the integrated light module 20, USB ports 12 or Ethernet Hubs 14 and radio 16 are powered by the same power supply. In other embodiments, individual modules or components may receive power from different sources, for example, multiple power supplies, AC power, or a reserve power source such as a battery.

In one embodiment, the USB hub 12, the Ethernet hub 14, and/or the Bluetooth radio module 16 are connected to a data network that is linked to a data monitoring and controlling station over data conductors 36. For example, data collected by the soil moisture sensor (not shown) is communicated from the sensor to the Bluetooth radio module 16 on the fixture 10 and from the radio module to the data monitoring and controlling station over the conductors 36. Based on the sensed soil moisture the monitoring and control station can energize a pump or an actuated valve (not shown) for supplying water to soil-based plants. In other embodiments, temperature and other sensors are connected to the fixture via the USB port. The connection provides power to the sensor and a communication channel that allows sensor data to be received or transmitted via the fixture. In one embodiment the fixture is connected (via wireline or wireless connection) to a network of devices or directly to one or more devices including but not limited to fans, heating and air conditioning systems, humidifiers or dehumidifiers, window openers or window shades, lighting control system, sprinklers and irrigation systems or other actuation controls. Connecting and powering sensors from individual fixtures and using the sensor data to control devices within the grow environment allows convenience, flexibility and adaptability, and means in general to finely monitor and control the plant grow operation. For example a temperature sensor data can be used to in conjunction with ventilation, heating and air conditioning and other systems to monitor and adjust environmental parameters such as air and plant temperature and identify, create or eliminate microclimates within a grow facility. Actuators may be programmed to respond automatically to various sensor data. Alternatively, a wide variety of real time sensor data may be monitored or accessed by a system operator who may adjust environment parameters directly (e.g., manually).

According to some embodiments, when a sensor is connected to a fixture, for example via plugging it into a USB port on the fixture or by pairing the sensor with the fixture via Bluetooth or other PAN communications methods, the location of that sensor, e.g., on or near the specific fixture, is automatically known. Knowing where a specific sensor is located, e.g., within a grow facility, provides for increased resolution of sensing activities by allowing the sensor data from each unique sensor to be associated with a specific location within the grow facility. For example, if one or more specific temperature sensors indicate an aberration in temperature, the location of that temperature variation can be identified and climate control (e.g., via fans or HVAC system) targeting that specific location can be effected. In these embodiments, the location and relative position and configuration of each fixture within the grow facility is known. In some embodiments, each fixture has a unique identifier associated with it to identify it amongst other fixtures and the location of each fixture is entered into a database or other data store. When a sensor is connected or otherwise paired with a specific fixture, the addition of that sensor can be communicated (e.g., via the network infrastructure) to the data store thereby assigning both a specific fixture and grow facility location to that sensor. In some embodiments near field communication (NFC) can be used to pair a sensor with a fixture or other device. In some embodiments a computer, tablet, or smartphone may be used as an intermediary in pairing the sensor and fixture by means of a software application and communications facility resident on the tablet or other computerized device. The ability to automatically associate a location of each sensor when it is connected or paired with a lighting fixture provides for flexibility and customization in sensing and environmental monitoring and for fine tuning environmental control and other grow facility devices.

FIG. 2a shows an LED light fixture with integrated external power ports according to one embodiment of the invention. LED lighting fixture 50 includes structural frame 55, one or more integrated lighting modules 52 for providing illumination and one or more integrated USB ports 54 (or alternatively an Ethernet hub) for providing a source of external power, and in some embodiments the USB ports 54 are enabled and utilized for data communications. The LED lighting modules 52 comprise one or more LEDs (not shown). The LED lighting modules are powered by an internal power supply which is connected to main power via a main power cord according to this embodiment (neither power supply or power cord are shown). The USB port (or Ethernet Hub) may be powered by the main power line, an internal power supply or other means. Optional wireless communication capability such as a Bluetooth transceiver (not shown) may also be incorporated into the device. The LED lighting fixture 50 also includes a means for hanging or securing a supplemental lighting unit. In this embodiment, the securing means is a slot or slotted flange 56 incorporated into the main fixture 50, but many other securing arrangements are possible. FIG. 2b shows a supplemental lighting fixture or light bar 57 according to some embodiments. The light bar 57 comprises an LED light engine (not shown) and a USB or Ethernet power input port 58 for receiving power. The light bar 57 also includes means for attaching it to the LED lighting fixture 50 so that the light bar 57 may be hung or otherwise supported or attached to the main light fixture 50. In this embodiment, the means of attachment include a protruding tab 59 designed to fit into slotted flange 56 of LED fixture 50. The light bar 57 and LED light engine are powered by power received via the USB port (or Ethernet hub) and do not require other sources of external power. The supplemental LED light bar may be designed to output a fixed light spectrum or a tunable spectrum. In embodiments where the light bar can produce a tunable spectrum, the power to and control (e.g., via data signaling) of the light bar output may be controlled via the USB (or Ethernet) connections.

Figure 2C:
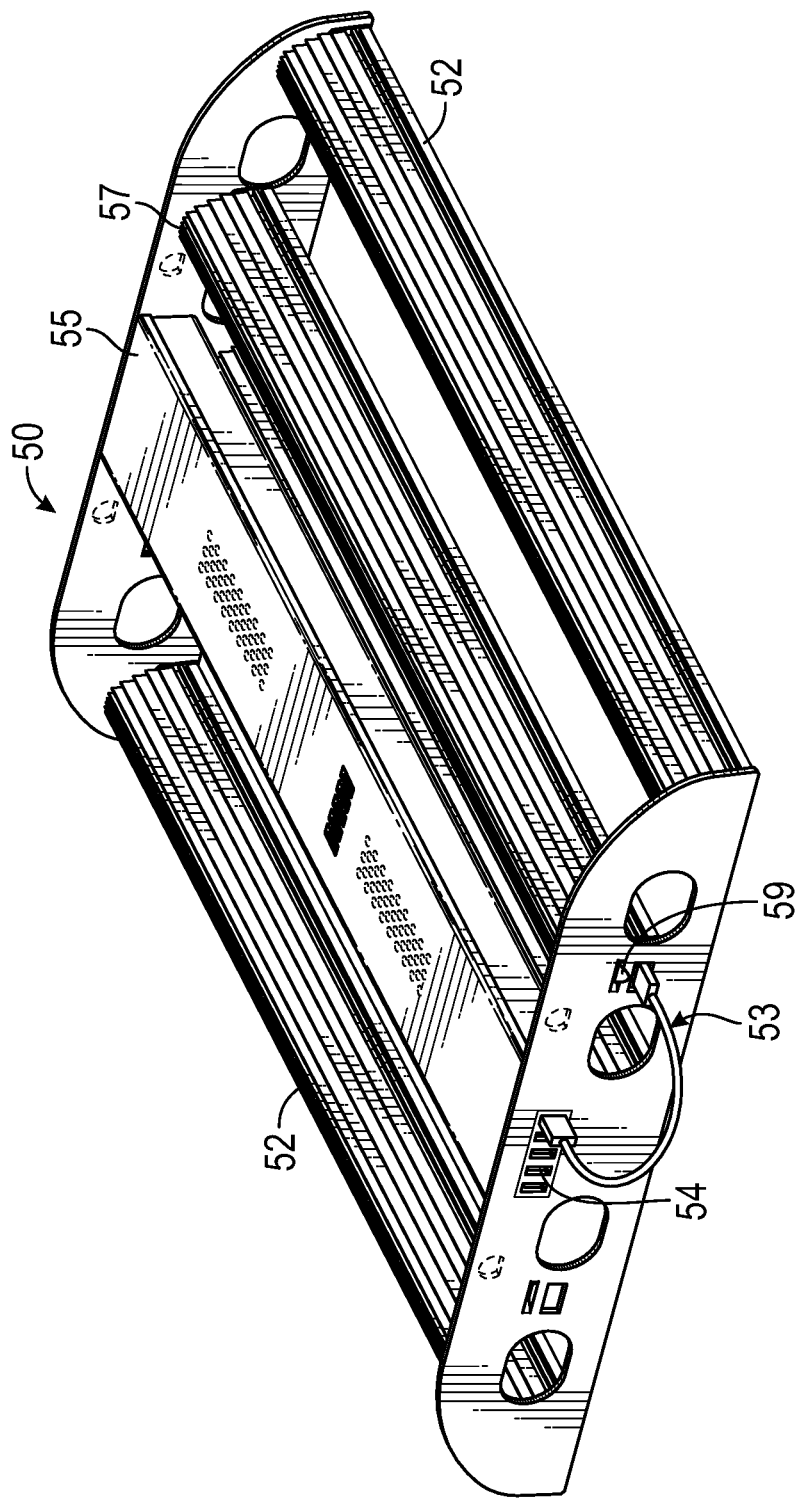

Embodiments of the invention wherein supplemental light bars may be added to the main fixture provides for an increase in flexibility of the main lighting fixture and grow operation. The ability to modify the spectrum and/or intensity of photosynthetically active radiation (PAR) directed and delivered to plant targets allows for flexibility and customization in plant growth operations. Examples include but are not limited to adding ultraviolet light to increase yield near end of a growth cycle, or increasing infrared radiation to trigger the onset of flowering. Generally, supplemental lighting bars also provide the means to customize light spectrum and intensity to produce photo-morphological effects in plants. FIG. 2c shows the embodiment wherein the light bar 57 is attached to and powered by the main fixture 50, and includes an LED light fixture 50, including integrated lighting modules 52, integrated USB ports or Ethernet hub 54, and attached supplemental LED light bar 57 attached via attachment means 59. In this example the attachment means is a tab 59 of the light bar 57 securing into a slot 56 of the main fixture 50. A conductive cable 53 (e.g., a USB cable or Ethernet cable depending on the application) extends from the main fixture's USB (or Ethernet) power port and inputs into the input port 58 of the LED light bar. In operation, the LED light bar 57 is powered by the USB or Ethernet port incorporated into the main LED fixture 50. Multiple light bars or other supplemental light modules may be attached and powered by the power ports of the main fixture 50 according to different embodiments. The specific locations of the USB ports shown are examples only and the USB ports, as will be evident to those skilled in the art, could be incorporated in one or more of a variety of locations on the main LED light fixture and/or supplemental LED light bar. Power and communications could alternatively be provided via an Ethernet hub on the main fixture and an Ethernet connector on the light bar. In this embodiment, an Ethernet cable would be used to connect the main fixture to the supplemental light bar. It is to be understood that the location of USB ports or Ethernet hubs, the particular design and configuration of an LED light fixture and light bars and their relative arrangements and means of connecting, as shown in these embodiment, are but example embodiments and many other designs, configurations and arrangements are possible. For instance, the USB ports or Ethernet hub may be located on the top side or the bottom side or anywhere else on the fixtures that is desired and appropriate for the particular luminaire design.

FIGS. 3a and 3b show examples of supplemental lighting fixtures being powered by a cable connection to a primary lighting fixture according to some embodiments. As shown in FIG. 3a, primary LED lighting fixture 60, comprising one or more integrated LED light modules 61 and is suspended, for example from the ceiling in a grow facility over one or more plants (not shown), and is powered by a main power cable, for example AC power (not shown). The primary fixture 60 comprises an external port for providing external power (e.g., a USB port or Ethernet hub) 62 and may optionally include means of wireless communications, sensors, and other components (not shown). Supplemental lighting fixture 64 is suspended in proximity to the primary fixture 60, and includes a power input port 65 to receive power. A conductive cable (USB or Ethernet) 63, with appropriate connectors, delivers power, and optionally data communications, from the external power output port 62 on the primary fixture 60 to the supplemental fixture 64 via its power input port 65. FIG. 3b shows an embodiment wherein supplemental lighting fixtures 68 are suspended from or otherwise attached to the primary fixture 60. The supplemental light fixtures 68 are attached via hangers 69 to the primary fixture. The hangers 69 may be stand alone units designed to connect to both primary and supplemental fixtures or alternatively they may be integrated into one or each of the fixtures. Power is supplied to the supplemental fixtures 68 via conductive cables 63 that carry power from the external power port 62 on the primary fixture to the input power port 65 on the supplemental fixture. Many variations of using supplemental lighting units, whether stand alone or attached to the primary fixture, that are powered by one or more external power ports on the primary fixture are contemplated and the embodiments of the invention are not limited to any particular arrangement.

Figure 4:
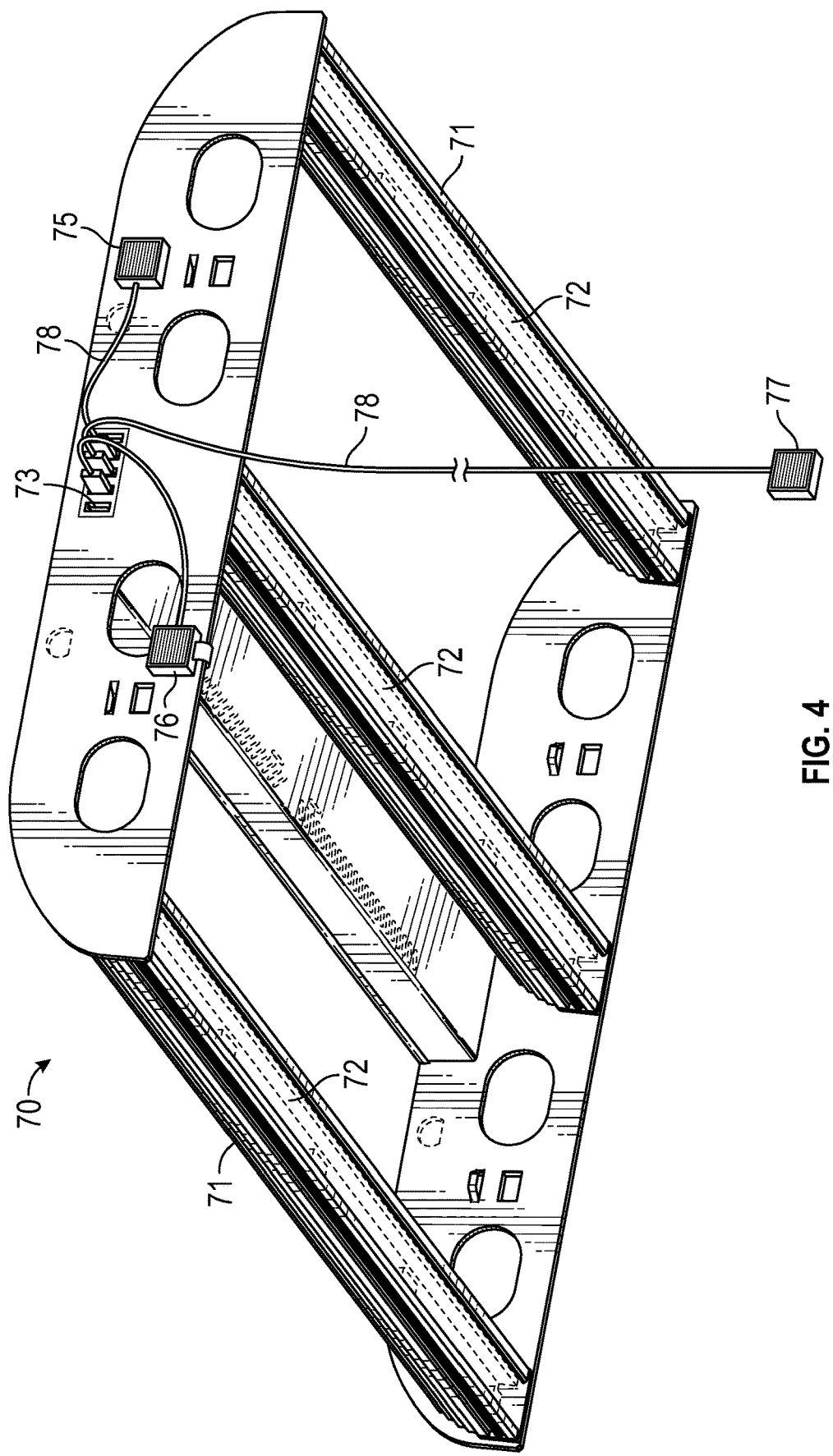
FIG. 4 illustrates an LED grow light fixture with integrated external power and communication ports and attached sensors according to some embodiments.

FIG. 4 shows an LED grow light fixture 70 with integrated external power ports 73 for providing power to and communications with one or more sensors, transducers or other measuring or data generating devices according to some embodiments. The LED grow light fixture 70 comprises one or more integrated lighting modules 71, each lighting modules comprising one or more LED boards 72 containing LEDs. The fixture 70 includes one or more power supplies (not shown) for powering the lighting modules 71 and a main power input cable (not shown). The fixture 70 also comprises a power and communications ports (e.g., USB port or Ethernet hub) 73, and one or more sensors or transducers 75, 76, and 77 for measuring, receiving or detecting environmental, lighting or other sensory input. In one embodiment, a sensor 75 is incorporated into the fixture 70 and is integral therewith. Embodiments may also include detachable sensors such as shown as 76 and 77. Sensor 76 affixes to the main fixture 70 via a dip, magnet or other securing means. Sensor 77 is tethered to fixture 70 such that it can be positioned at a variable distance below or away from the main fixture 70. Such tethering allows for the sensor to be place in closer proximity to the area of measurement interest (e.g., plant canopy). Each of the example sensors 75, 76, and 77 receive power and can transmit sensor data via one or more conductive cables 78 that connect each sensor to the external power and communications port 73. In one embodiment the conductive cable 78 for sensor 77 also functions as an adjustable tether. The location of the sensors as shown is for illustrative purposes only and it is to be understood that the sensors may be located in a variety positions on and in relation to the LED grow light fixture. Each sensor may be "plug and play" in that each sensor may be connected via the appropriate cable and connectors (e.g., USB or Ethernet) to the power and communications port 73 on the main fixture. In these embodiments, the sensors are powered by the external power port 73 and may transmit sensor data to the fixture or an external controller for recordation and processing. A programmable controller (not shown), integrated into the main fixture or remote from the fixture, for instance an external laptop computer, may process the sensor data and adjust one or more devices in the grow facility operation in response to specific sensor data thereby providing a sensor feedback and control system. In one embodiment, the integrated sensor 75 is a photometric sensor for measuring light spectrum and intensity. The spectral data from the integrated sensor 75 may be used to tune the output spectrum of one or more LED lighting units. In another embodiment, the clip-on sensor 76 is a temperature sensor. The temperature data may be used by the controller to adjust ventilation or air conditioning within the grow facility or in proximity to the lighting fixture on which the sensor is attached. In another embodiment, the tethered sensor 77 is a motion sensor for detecting movement in the grow facility that may result in the triggering alarms or alerts (for instance, in case of unauthorized intrusion into the grow facility). The tether that secures the tethered sensor may be the power and communications cable itself in some embodiments. In another embodiment, a sensor is a proximity sensor. In this embodiment, the proximity sensor measures the distance from the fixture to the plant canopy, and this information can be used to adjust the fixture to maintain optimum distance between the fixture light source and the canopy (e.g., automatically or manually). The received sensor data at the main fixture 70 may be transmitted to other devices directly or via a data network, e.g., PAN, Wi-Fi or Ethernet (not shown). In some embodiments, this network is also used by the controller to send control signals to devices and actuators within the grow facility. Additional embodiments include the main fixture 70 comprising an integrated or attachable wireless communications capability that is powered by the power port 73 or alternatively is powered by the fixture power supply. In some embodiments one or more of a variety of sensors can be added as needed to measure environmental and/or plant growth data, and these data may be used by an external programmable controller to automatically control other devices or actuators in response to measured environmental parameters. Alternatively, the sensor data may be relayed to a remote station for human monitoring.

Figure 5:
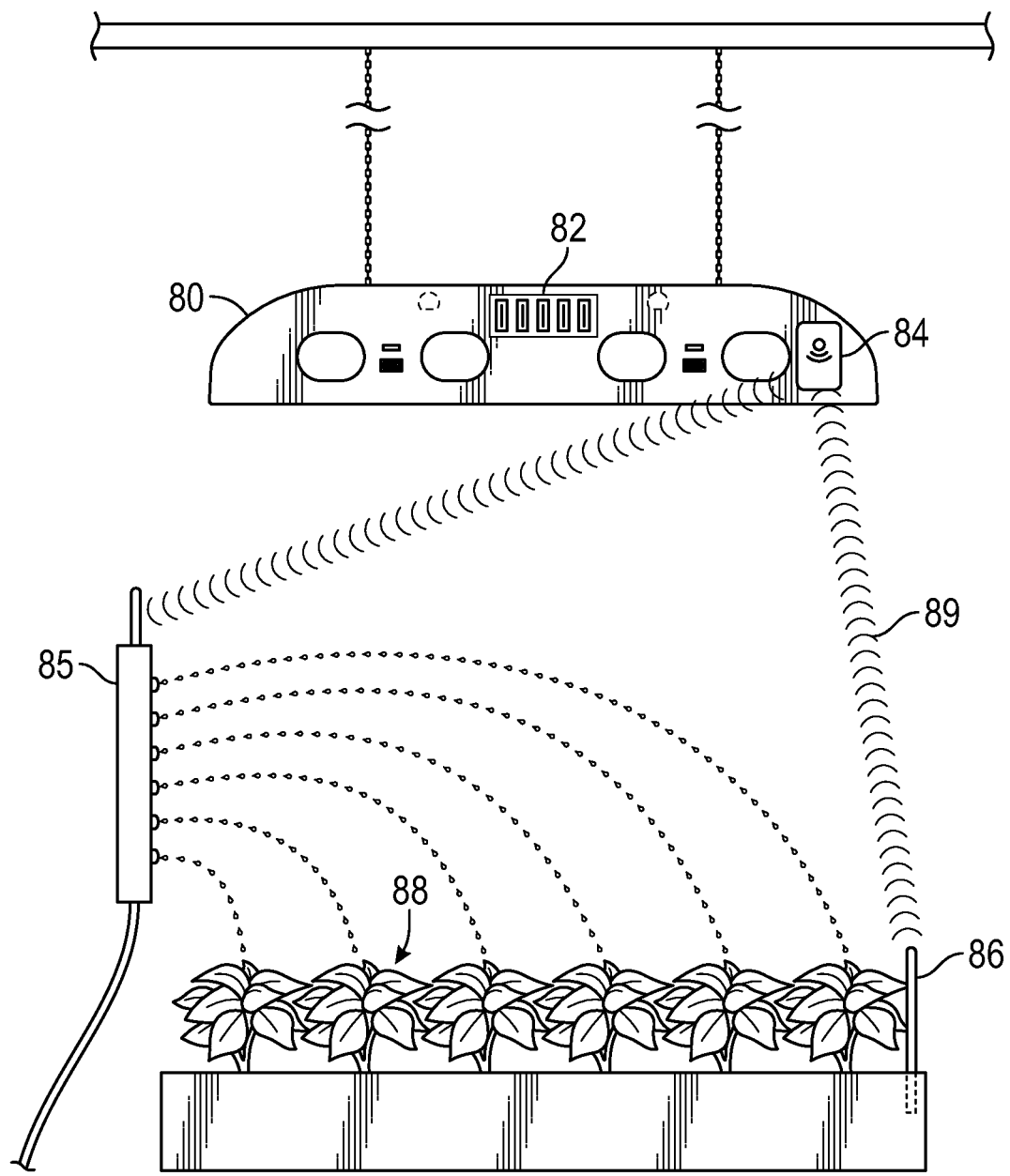
FIG. 5 illustrates an application of an LED grow light fixture with an integrated low energy radio communications module according to one embodiment.

FIG. 5 shows an end view of an LED grow light fixture 80 with integrated external power port 82 and an integrated wireless communication module 84 for receiving data from a remote soil sensor 86 via a wireless transmission according to one embodiment. In one embodiment, LED grow fixture 80 is suspended via hangers or other support means above plant growth canopy 88 and comprises an integrated radio module 84, in this example a Bluetooth radio module, for receiving remote sensor data 89. In one embodiment, the remote sensor 86 is a soil or grow media sensor, which is in contact with the soil or other grow media, and which senses and transmits data regarding the soil or grow media. The remote sensor may be powered by internal means such as a battery, capacitor or photovoltaic cell (e.g., powered by incident light from the light fixture) or may be provided power by a remote source via wire or wireless transmission. Examples of such sensor data include but are not limited to, temperature, pH, salinity, moisture and nutrient levels. In some embodiments, the sensor continually or intermittently transmits sensor data according to a schedule. In other embodiments, the sensor is queried by the LED fixture via the radio module 84 and the sensor 86 transmits data to the fixture in response to the query. The sensor data may be used by a separate networked controller (not shown) to effect changes to the soil or grow media including increasing or decreasing temperature via heaters or chillers, adding nutrients and/or water and adjusting salinity or acidity via a circulation, filtration or feeding system. In some embodiments, the sensor data received by the light fixture's radio module 84 is transmitted via Ethernet or other wireline communications means to a remote controller or monitoring station. In other embodiments, the sensor data is transmitted wirelessly (e.g., via Bluetooth or Wi-Fi). In some embodiments the controller may resident on the light fixture. In other embodiments, the sensor data is transmitted via the lighting fixture to a remote computer such as a laptop or tablet. In some embodiments the radio module 84 of the main fixture 80 transmits signaling or actuator commands to remote devices enabled to receive radio signaling. As shown in FIG. 5 and according to one example, radio module 84 transmits a signal to a remote sprinkler or mister 85 to initiate watering of the plants in response to data from sensor 86 indicating a need for increased moisture.

Although embodiments of the present invention have been described for use with plants growing in typical controlled environmental settings, such as with soil, soil-less solid media, hydroponics, aeroponics, etc., the teachings are also suitable to any application where photosynthetically active radiation is required and supplied and where sensor data for control and/or monitoring of the environment is advantageous. For example, the teachings can be applied for illumination, monitoring, and actuation in marine aquaculture.

In some embodiments grow light fixtures incorporate digital power solutions and may be powered by digital power, conventional power or both. Digital power refers to power transmitted digitally. One example of digital power solution that may be used in an embodiment is that provided by VoltServer, Inc, and is described in the following US patent documents that are incorporated herein in their entireties: 20150207318, U.S. Pat. Nos. 8,781,637 and 9,184,795. Digital power provides a touch-safe electrical transmission at high power levels and an inherent ability to digitally control a host of modern electronic devices connected to the power distribution system. In contrast with analog power transmission systems, in digital power transmission systems electrical energy is "packetized" into discrete units, and individual units of energy can be associated with analog and/or digital information that can be used for the purposes of optimizing safety, efficiency, resiliency, control or routing. Advantages of using digital power include reduced installation time and costs and increased efficiency. For example, digital power can be transmitted over Ethernet (or CAT5) type cable. The cable is relatively inexpensive and easy to install and does not require meeting certain necessary building safety code requirements which may add to installation time and cost. In these embodiments grow light fixtures may be connected to a power source through Ethernet cable (or other digital cable or wire suitable for digital power transmission), providing a safe, quick and cost effective solution for grow facilities.

In some embodiments, one or more fixtures functions as a hub from which power is routed and distributed to other fixtures. In other embodiments, fixtures may be added at will to a grow light facility by simply tying the fixture into the digital power network via a network cable as described above. In some embodiments both data and power are transmitted over the same cable. In other embodiments, data may be transmitted over different connections than that of the power including Wi-Fi, blue-tooth, infrared, and other data communication protocols.

Another embodiment of the invention relates to the turn-on timing of individual grow lights in a plant growing facility or the turn-on time of individual power supplies within one grow light fixture. It is known that when a modern switching power supply is energized from a cold state the many reactive components (capacitors and inductors) in the power supply lead to transient currents and voltages that differ substantially from steady-state currents and voltages. Supplies will pull a significantly greater current during startup (referred to as the in-rush current) than they demand once steady-state operation has been achieved. This simultaneous in-rush event is complicated by spaced apart power supplies, such as in a large plant grow facility, and also by the presence of transient voltage suppressors, under-voltage shut-off circuits, and over-current protection devices within each supply.

While power supplies are generally tolerant of a small number powering up and demanding in-rush currents simultaneously, the transient effect of powering a large number of such supplies simultaneously can lead to instability in the line voltage that is delivered by each supply to its load. Due to simultaneous in-rush demands of many supplies, action of the protection devices within the supplies, line propagation delays on long circuits, and inductance of the transformer coils, the output from the power supplies can interact to produce unacceptable voltage fluctuations on the circuit, potentially introducing voltage fluctuations that lie outside of the acceptable operating range for an individual power supply. Although this effect is expected to be short-lived for any one occurrence, the cumulative damage inflicted on many supplies over a long time duration (i.e., over many power-cycles) can lead to premature power supply failure.

According to this embodiment of the invention, the grow light fixture further comprises a power-on delay switch (alternatively, the delay switch can be mounted in the power line carrying power to the fixture) that waits a programmable or random period of time before closing and supplying power to the fixture and the lights mounted within it. With the use of the delay switch, when multiple fixtures are disposed on a single power-carrying circuit, power is supplied to each fixture at a slightly different time. This feature limits the total in-rush current on the power circuit and thus avoids unnecessary circuit breaker tripping.

The switch can be either programmable, such that each supply on a single circuit is programmed to turn-on at a slightly different time, or each switch may generate the delay time randomly. If generated randomly, the range of potential delay times can be uniformly distributed over an interval large enough to make it statistically unlikely that more than one supply powers on simultaneously. Typically, an in-rush current event may have a 100 microsecond duration so that several switching power supplies can be powered up during a one second interval. Staggering the power supply turn-on times over a few second interval will have no practical significance to operation of the grow facility.

While the invention has been described with reference to exemplary embodiments, it will be understood by those skilled in the art that various changes may be made and equivalents may be substituted for elements thereof without departing from the scope of the invention. It should be understood that the diagrams herein illustrates some of the system components and connections between them and does not reflect specific structural relationships between components, and is not intended to illustrate every element of the overall system, but to provide illustration of some embodiments of the invention to those skilled in the art.

In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include many variants and embodiments. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A lighting fixture with an integrated supplemental power source comprising:
   an LED light engine comprising at least one LED;
   a power supply for powering said LED light engine;
   an auxiliary power source operative to provide electrical output power from the lighting fixture;
   an input means for receiving power from an external power source to provide power to said power supply and to said auxiliary power source; and
   means for near field communications with at least one actuator or sensor.

2. The lighting fixture of claim 1 wherein said means for near field communications includes Bluetooth reception and transmission capability.

3. The lighting fixture of claim 1 further comprising a sensor for sensing at least one parameter from the environment or the lighting fixture and wherein said sensor is powered by said auxiliary power source and is detachable from said fixture.

4. The lighting fixture of claim 1 further comprising a backup power source.

5. The lighting fixture of claim 1 further comprising an integrated proximity sensor.

6. The lighting fixture of claim 1 further comprising a programmable controller integrated into said fixture operable to process at least one sensor datum and adjust at least one operational parameter of said fixture.

7. The lighting fixture of claim 6 wherein said integrated controller is operable to control or adjust at least one remote actuator via wireless communication.

8. An LED lighting fixture configured to operate with digital power and provide auxiliary power comprising:
   an LED light engine operable to be powered by a digital power source;
   an auxiliary power source operative to provide output power from the lighting fixture; and
   an input means for receiving digital power for powering said LED light engine and for powering said auxiliary power source.

9. The LED lighting fixture of claim 8 wherein said auxiliary power source provides digital power output.

10. The LED lighting fixture of claim 8 wherein said auxiliary power source provides non-digital power output.

11. The LED lighting fixture of claim 8 further comprising means for data communications between the fixture and one or more external devices.

12. The LED lighting fixture of claim 11 wherein said means for data communication includes a wireless antenna.

13. The LED lighting fixture of claim 8 further comprising at least one onboard sensor that is powered by digital power or the auxiliary power source.

14. The LED lighting fixture of claim 8 further comprising at least one onboard actuator that is powered by digital power or the auxiliary power source.

15. The LED lighting fixture of claim 8 further comprising means for near field communication.

16. The LED lighting fixture of claim 8 further comprising a modular supplemental LED light bar that is detachable from said fixture and which is powered by said auxiliary power source.

17. The LED lighting fixture of claim 16 wherein said supplemental LED light bar produces a different illumination output spectrum than said LED light engine.

18. The LED lighting fixture of claim 8 wherein said input means for receiving digital power comprises a power-on delay switch to provide current in-rush protection.

19. The LED lighting fixture of claim 18 wherein said switch is a programmable switch programmed with a random delay to delay current supplied to said light engine.

20. An LED lighting fixture with an integrated supplemental power source and data communication and control capabilities comprising:
   an LED light engine comprising at least one LED;
   an auxiliary power source operative to provide electrical output power from the lighting fixture;
   means for data communication between said fixture and at least one sensor and one actuator; and
   a programmable controller for receiving and processing sensor data and for controlling an actuator in response thereto.

* * * * *